United States Patent
Ly et al.

(10) Patent No.: US 12,250,193 B2
(45) Date of Patent: *Mar. 11, 2025

(54) SENDING MESSAGES FROM SMART SPEAKERS AND SMART DISPLAYS VIA SMARTPHONES

(71) Applicant: GOOGLE LLC, Mountain View, CA (US)

(72) Inventors: Vinh Quoc Ly, Sunnyvale, CA (US); Yan Zhong, Sunnyvale, CA (US); Ashrith Sheshan, San Jose, CA (US); Xiaobin Yu, San Jose, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/211,073

(22) Filed: Jun. 16, 2023

(65) Prior Publication Data
US 2023/0336521 A1 Oct. 19, 2023

Related U.S. Application Data

(63) Continuation of application No. 16/947,482, filed on Aug. 3, 2020, now Pat. No. 11,700,226.

(51) Int. Cl.
*H04L 51/58* (2022.01)
*G10L 17/22* (2013.01)
*H04W 4/12* (2009.01)

(52) U.S. Cl.
CPC .............. *H04L 51/58* (2022.05); *G10L 17/22* (2013.01); *H04W 4/12* (2013.01)

(58) Field of Classification Search
CPC ......... G10L 17/00; G10L 17/22; H04L 47/00; H04L 47/70; H04L 47/74–745;
(Continued)

(56) References Cited

U.S. PATENT DOCUMENTS 6,304,637 B1 10/2001 Mirashrafi
9,661,105 B2 5/2017 Sharma et al.
(Continued)

FOREIGN PATENT DOCUMENTS

CN 105141650 12/2015
CN 108885740 11/2018
(Continued)

OTHER PUBLICATIONS

Intellectual Property India; Examination Report issued in Application No. 202227057575; 5 pages; dated May 2, 2023.
(Continued)

*Primary Examiner* — Boris D Grijalva Lobos
(74) *Attorney, Agent, or Firm* — Gray Ice Higdon

(57) ABSTRACT

Techniques are described herein for using a smart device such as a standalone assistant-centric interactive speaker and/or a standalone assistant-centric interactive display with speaker(s) to send a message using a messaging application on a client device such as a smartphone. A method includes: receiving, by a first device, a request from a first user to send a message to a second user; determining that a messaging application corresponding to the request is unavailable on the first device; and in response to determining that the messaging application corresponding to the request is unavailable on the first device: selecting a second device on which the messaging application corresponding to the request is available; and sending, to the second device, a command that causes the second device to send the message from the first user to the second user using the messaging application on the second device.

13 Claims, 5 Drawing Sheets

(58) Field of Classification Search
CPC ........... H04L 47/748; H04L 47/76–767; H04L 51/00; H04L 51/58; H04L 65/00; H04L 65/1066–1096; H04W 4/00; H04W 4/12
See application file for complete search history.

(56) References Cited

U.S. PATENT DOCUMENTS

| | | | |
|---|---|---|---|
| 9,980,183 | B1 | 5/2018 | Segal |
| 10,157,614 | B1 | 12/2018 | Devaraj |
| 10,198,877 | B1 | 2/2019 | Maltsev et al. |
| 10,217,152 | B2 * | 2/2019 | Ku .................... G06Q 50/01 |
| 10,827,329 | B1 | 11/2020 | Dowlatkhah |
| 2002/0007453 | A1 | 1/2002 | Nemovicher |
| 2005/0111631 | A1 | 5/2005 | Jordan, Jr. |
| 2007/0067392 | A1 * | 3/2007 | Torres .................... G06Q 10/10 709/206 |
| 2008/0208978 | A1 | 8/2008 | Aschauer |
| 2010/0184406 | A1 | 7/2010 | Schrader |
| 2013/0227030 | A1 | 8/2013 | Eidelson |
| 2014/0073300 | A1 | 3/2014 | Leeder |
| 2014/0181886 | A1 | 6/2014 | Goodman |
| 2014/0207472 | A1 | 7/2014 | Opaluch |
| 2015/0052582 | A1 | 2/2015 | Chow |
| 2015/0350856 | A1 * | 12/2015 | Circosta .................. H04W 8/22 455/466 |
| 2016/0234366 | A1 * | 8/2016 | De Filippis ........... H04W 12/33 |
| 2018/0032503 | A1 | 2/2018 | Swart et al. |
| 2018/0338037 | A1 | 11/2018 | Ly et al. |
| 2018/0338038 | A1 | 11/2018 | Ly et al. |
| 2019/0122001 | A1 | 4/2019 | Bradley et al. |
| 2020/0110864 | A1 | 4/2020 | Casado et al. |
| 2020/0145473 | A1 | 5/2020 | Cumaranatunge |
| 2020/0236072 | A1 * | 7/2020 | Philip ..................... H04L 51/04 |
| 2021/0335356 | A1 | 10/2021 | Burakov |
| 2022/0038417 | A1 | 2/2022 | Ly |
| 2022/0217553 | A1 * | 7/2022 | Kim ..................... H04W 24/04 |

FOREIGN PATENT DOCUMENTS

| | | |
|---|---|---|
| CN | 109698856 | 4/2019 |
| CN | 111052685 | 4/2020 |
| TW | 519969 | 2/2016 |
| WO | 2018125717 | 7/2018 |
| WO | 2020076816 | 4/2020 |

OTHER PUBLICATIONS

European Patent Office; International Search Report and Written Opinion of Ser. No. PCT/US2020/065048; 11 pages; dated Mar. 25, 2021.

China National Intellectual Property Administration; Notification of First Office Action issued in Application No. 202080100650.7; 28 pages; dated Jul. 25, 2024.

European Patent Office; Communication pursuant to Article 94(3) EPC issued in Application No. 20839482.5; 6 pages; dated Aug. 6, 2024.

China National Intellectual Property Administration; Notice of Grant issued in Application No. 202080100650.7; 4 pages; dated Dec. 5, 2024.

* cited by examiner

SENDING MESSAGES FROM SMART SPEAKERS AND SMART DISPLAYS VIA SMARTPHONES

BACKGROUND

Humans can engage in human-to-computer interactions with interactive software applications referred to herein as "automated assistants". For example, a human (which when interacting with an automated assistant may be referred to as a "user") may provide an input to the automated assistant that can cause the automated assistant to generate and provide responsive output, to control one or more smart devices, and/or to perform one or more other functionalities. The input provided by the user can be, for example, a touch input (e.g., via a touchscreen), a gesture (e.g., detected via a camera), and/or a spoken natural language input (i.e., utterance detected via microphone(s)), which may in some cases be converted into text (or other semantic representation) and then further processed.

Many users may engage automated assistants using multiple client devices. For example, some users may possess a coordinated "ecosystem" of client devices such as one or more smartphones, one or more tablet computers, one or more wearable computing devices, one or more smart televisions, one or more standalone assistant-centric interactive speakers, and one or more standalone assistant-centric interactive displays with speaker(s), among other client devices. A user may engage in human-to-computer dialog with an automated assistant using any of these client devices (assuming an automated assistant client is installed).

Techniques exist to enable user(s) (e.g., a single user, multiple users in a family, co-workers, co-inhabitants, etc.) to utilize an automated assistant client to send a message to another user in response to a request from the user that is received by the automated assistant client, using a messaging application corresponding to the request that is present on a particular client device on which the automated assistant client that received the request is running. However, such techniques present drawbacks such as low reliability, as an automated assistant client may not be able to send a message to another user in response to a request received by the automated assistant client, if a messaging application corresponding to the request is not present on the particular client device on which the automated assistant client that received the request is running. Further, such techniques can burden computational and/or network resources, by requiring messaging applications to be installed on additional client devices, even if the messaging application is already installed on another client device associated with a user.

SUMMARY

Implementations disclosed herein relate to using a smart device such as a standalone assistant-centric interactive speaker and/or a standalone assistant-centric interactive display with speaker(s) to send a message using a messaging application on a client device such as a smartphone. For example, a first device (e.g., a smart device) can receive a request from a first user to send a message to a second user. A messaging application corresponding to the request can then be determined to be unavailable on the first device. In response to determining that the messaging application corresponding to the request is unavailable on the first device, a second device (e.g., a client device such as a smartphone) on which the messaging application corresponding to the request is available can then be selected, and a command that causes the second device to send the message from the first user to the second user using the messaging application on the second device can then be sent to the second device.

In some implementations, the determining that the messaging application corresponding to the request is unavailable on the first device can include determining that the messaging application is not present on the first device and determining that the messaging application is not accessible from the first device using an application programming interface.

In some implementations, the first device can determine an account of the first user based on contextual information, and the selecting the second device can be based on the account of the first user. In some implementations, the request can be included in an utterance, and the determining the account of the first user can include determining that the utterance is spoken by the first user based on speaker-identification features of the utterance. In other implementations, the request can be included in an utterance spoken by a person, and the determining the account of the first user can include receiving, from a camera of the first device, an image of the person, and determining that the utterance is spoken by the first user based on the image.

In some implementations, the first device can be a non-smartphone device, and the second device can be a smartphone device of the first user. In some implementations, the request can specify the messaging application, and the messaging application can utilize end-to-end encryption to send the message from the second device to a third device that is associated with the second user.

In some implementations, the receiving, the determining, the selecting, and the sending can be performed by a first automated assistant application running on the first device, and the command can be interpreted by a second automated assistant application running on the second device to cause the second automated assistant application to invoke the messaging application that is running on the second device to cause the messaging application to send the message from the first user to the second user. In some implementations, the second automated assistant application can invoke the messaging application without displaying second automated assistant application output, and the messaging application can send the message without displaying messaging application output.

In some implementations, the command can be interpreted by a second automated assistant application running on the second device to cause the second automated assistant application to respond by treating the request as being received directly by the second automated assistant application running on the second device. In some implementations, an acknowledgment indicating that the message was sent to the second user can be received from the second device, and in response to receiving the acknowledgement, the first device can output an audio or visual indication that the message was sent.

In some implementations, the determining, the selecting, and the sending can be performed by the first device. In other implementations, the determining, the selecting, and the sending can be performed by a computer server that is external to the first device and the second device.

In some additional or alternative implementations, a first automated assistant application running on a first device (e.g., a client device such as a smartphone) associated with a first user can receive a message received by a messaging application running on the first device. The first automated assistant application can then determine a second device (e.g., a smart device) associated with the first user, where the second device is running a second automated assistant application and the messaging application is unavailable on the second device. The first automated assistant application can then send the message to the second automated assistant application running on the second device.

In some implementations, the first automated assistant application running on the first device can receive, from the second automated assistant application running on the second device, a command to send a reply message using the messaging application. The first automated assistant application can then invoke the messaging application to cause the messaging application to send the reply message.

In some implementations, the first automated assistant application running on the first device can send, to the second automated assistant application running on the second device, a confirmation indicating that the reply message was sent. In some implementations, the first device is a smartphone device and the second device is a non-smartphone device. In some implementations, the sending the message can include sending a command that causes the second automated assistant application running on the second device to render the message at the second device.

In some additional or alternative implementations, a request can be can be received from a first user to send a message to a second user. A determination can be made as to whether or not a messaging application corresponding to the request is available on the system (e.g., a smart device). In response to determining that the messaging application corresponding to the request is available on the system, the message can be sent from the first user to the second user using the messaging application on the system. In response to determining that the messaging application corresponding to the request is not available on the system, an external device (e.g., a client device such as a smartphone) on which the messaging application corresponding to the request is available can be selected, and a command can be sent to the external device that causes the external device to send the message from the first user to the second user using the messaging application on the external device.

In some implementations, the receiving, the determining, the selecting, and the sending can be performed by a first automated assistant application running on the first device, and the command can be interpreted by a second automated assistant application running on the second device to cause the second automated assistant application to invoke the messaging application that is running on the second device to cause the messaging application to send the message from the first user to the second user.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
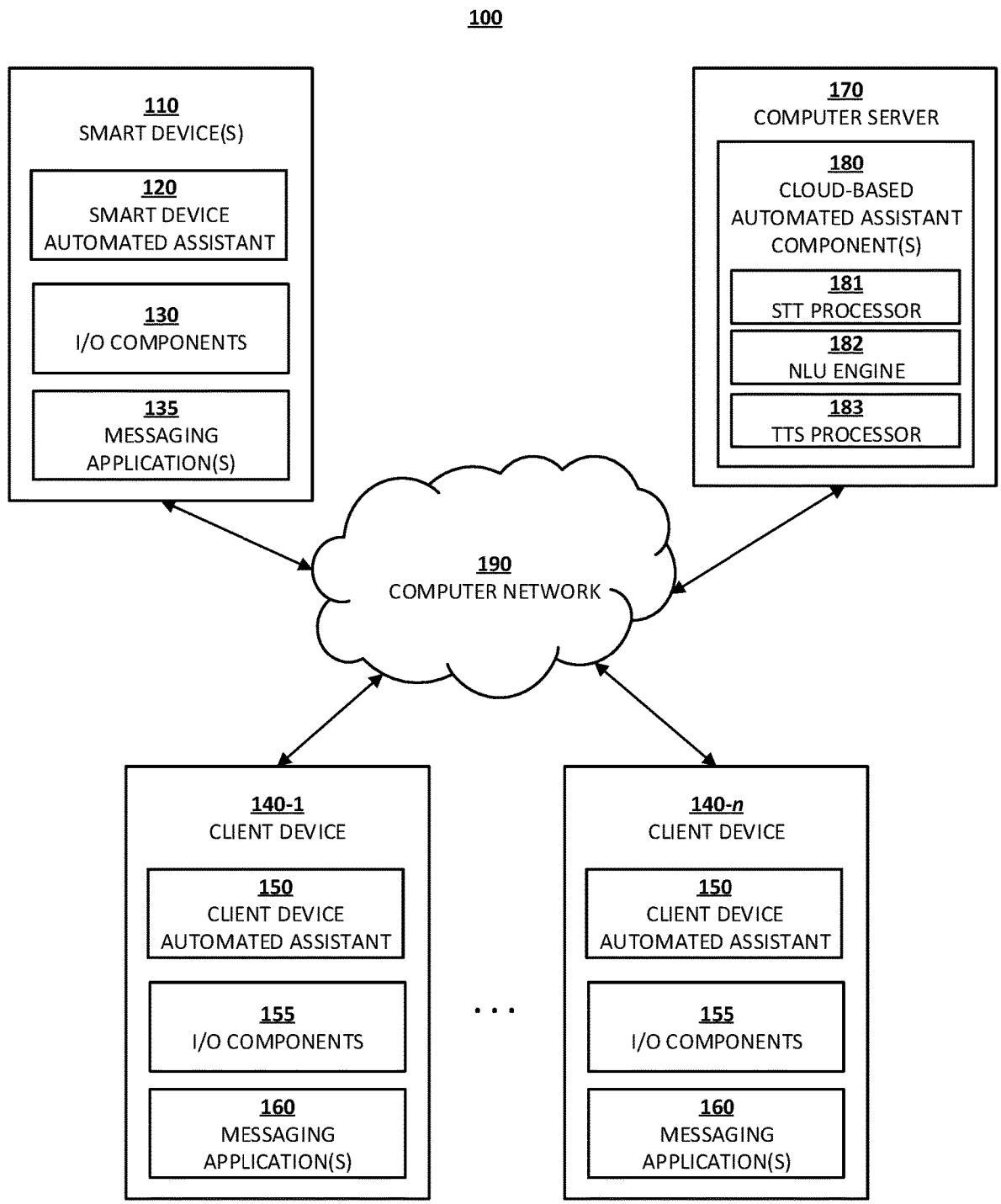
FIG. 1 schematically depicts an example environment in which selected aspects of the present disclosure may be implemented, in accordance with various implementations.

FIG. 1 schematically depicts an example environment 100 in which selected aspects of the present disclosure may be implemented, in accordance with various implementations. Any computing devices depicted in FIG. 1 or elsewhere in the figures may include logic such as one or more microprocessors (e.g., central processing units or "CPUs", graphical processing units or "GPUs") that execute computer-readable instructions stored in memory, or other types of logic such as application-specific integrated circuits ("ASIC"), field-programmable gate arrays ("FPGA"), and so forth. Some of the systems depicted in FIG. 1, such as a computer server 170, may be implemented using one or more server computing devices that form what is sometimes referred to as a "cloud infrastructure," although this is not required.

In implementations, the environment 100 may include one or more smart device(s) 110, such as a standalone assistant-centric interactive speaker, a standalone assistant-centric interactive display with speaker(s), a smart appliance such as a smart television, and/or a wearable apparatus of a user that includes a computing device (e.g., a watch of the user having a computing device, glasses of the user having a computing device, a virtual or augmented reality computing device, etc.). Additional and/or alternative smart devices 110 may be provided. In implementations, the smart device(s) 110 may be non-smartphone devices.

In implementations, the smart device(s) 110 may include an instance of a smart device automated assistant 120. The smart device automated assistant 120 can process user inputs received from input device(s) of I/O components 130, such as spoken inputs detected via microphone(s) of I/O components 130, touch inputs received via touch-screen displays of I/O components 130, images detected via camera(s) of I/O components 130, etc. Further, the smart device automated assistant 120 can optionally render various outputs via output device(s) of I/O components 130, such as speaker(s) and/or touch-screen displays of I/O components 130.

In implementations, the smart device(s) 110 may optionally include one or more messaging application(s) 135. Each of the messaging application(s) 135 may be an application that provides functionality to send messages from a user of the smart device 110 to one or more other users (e.g., a user of another smart device 110, a user of a client device 140-1, . . . , 140-*n*, or any other user of any other device) and receive messages from one or more other users that are sent to the user of the smart device 110.

In implementations, the environment 100 may also include client devices 140-1, . . . , 140-*n*, each of which may be a mobile phone computing device and may be associated with a different user. For example, the client device 140-1 may be a mobile phone computing device associated with a first user (e.g., a smartphone device of the first user), and the client device 140-*n* may be a mobile phone computing device associated with an n-th user (e.g., a smartphone device of the n-th user). Additional and/or alternative client devices 140-1, . . . , 140-*n* associated with various users may be provided, including desktop computing devices, laptop computing devices, and/or tablet computing devices, etc.

In implementations, each of the client devices 140-1, ..., 140-n may include an instance of a client device automated assistant 150. The client device automated assistant 150 can process user inputs received from input device(s) of I/O components 155, such as spoken inputs detected via microphone(s) of I/O components 155, touch inputs received via touch-screen displays of I/O components 155, images detected via camera(s) of I/O components 155, etc. Further, the client device automated assistant 150 can optionally render various outputs via output device(s) of I/O components 155, such as speaker(s) and/or touch-screen displays of I/O components 155.

In implementations, each of the client devices 140-1, ..., 140-n may include one or more messaging application(s) 160. Each of the messaging application(s) 160 may be an application that provides functionality to send messages from a user of a particular client device 140-1, ..., 140-n to one or more other users (e.g., a user of another client device 140-1, ..., 140-n or any other user of any other device) and receive messages from the one or more other users that are sent to the user of the particular client device 140-1, ..., 140-n. The messaging application(s) 160 may utilize end-to-end encryption to send and receive messages. For example, the messaging application(s) 160 may encrypt a message such that the encrypted message may only be decrypted by a user who is an intended recipient of the message, at a device that is associated with the user who is the intended recipient of the message (e.g., using another instance of the messaging application 160). In other implementations, the messaging application(s) 160 may send messages unencrypted (e.g., as clear text) or using other forms of encryption (e.g., non-end-to-end encryption).

In implementations, the environment 100 may include a computer server 170, which may be a node in a cloud infrastructure (cloud computing environment). The computer server 170 may include cloud-based automated assistant component(s) 180. In various implementations, one or more instances of the smart device automated assistant 120 of the smart device(s) 110 and/or one or more instances of the client device automated assistant 150 of the client devices 140-1, ..., 140-n can interface with the cloud-based automated assistant component(s) 180 in processing inputs and/or in generating outputs based on the inputs and/or in generating commands based on the inputs.

For example, the smart device automated assistant 120 of the smart device(s) 110 can transmit, to the cloud-based automated assistant component(s) 180, audio data corresponding to spoken input received after invocation of the smart device automated assistant 120 at the smart device(s) 110. The invocation of the smart device automated assistant 120 at the smart device(s) 110 can be based on detecting an invocation phrase (e.g., "OK Assistant"), interaction of a hardware button or graphical button that invokes the smart device automated assistant 120, in response to a gesture detected via a camera of the I/O components 130, and/or other invocation signal(s). The cloud-based automated assistant component(s) 180 can convert the audio data to text using speech-to-text (STT) processor 181, and perform natural language understanding (NLU) on the text using NLU engine 182 to determine an appropriate response. For example, the appropriate response can be a textual response that can optionally be converted to generated speech using text-to-speech (TTS) processor 183, and transmitted to the smart device automated assistant 120 for rendering of the generated speech via speaker(s) of the I/O components 130.

In another example, the client device automated assistant 150 of the client devices 140-1, ..., 140-n can transmit, to the cloud-based automated assistant component(s) 180, audio data corresponding to spoken input received after invocation of the client device automated assistant 150 at the client devices 140-1, ..., 140-n. The invocation of the client device automated assistant 150 at the client devices 140-1, ..., 140-n can be based on detecting an invocation phrase (e.g., "OK Assistant"), interaction of a hardware button or graphical button that invokes the client device automated assistant 150, in response to a gesture detected via a camera of the I/O components 155, and/or other invocation signal(s). The cloud-based automated assistant component(s) 180 can convert the audio data to text using STT processor 181, and perform NLU on the text using NLU engine 182 to determine an appropriate response. For example, the appropriate response can be a textual response that can optionally be converted to generated speech using TTS processor 183, and transmitted to the client device automated assistant 150 for rendering of the generated speech via speaker(s) of the I/O components 155.

In implementations, the smart device(s) 110, the client devices 140-1, ..., 140-n, and the computer server 170 may be communicatively coupled via one or more wide area networks (e.g., the Internet), indicated generally by computer network 190 of FIG. 1. It is noted that the smart device(s) 110, the client devices 140-1, ..., 140-n, and the computer server 170 can utilize one or more local area networks in accessing the computer network 190 and/or in locally communicating with one another. Such local area networks can include a Wi-Fi network and/or a mesh network.

Figure 2:
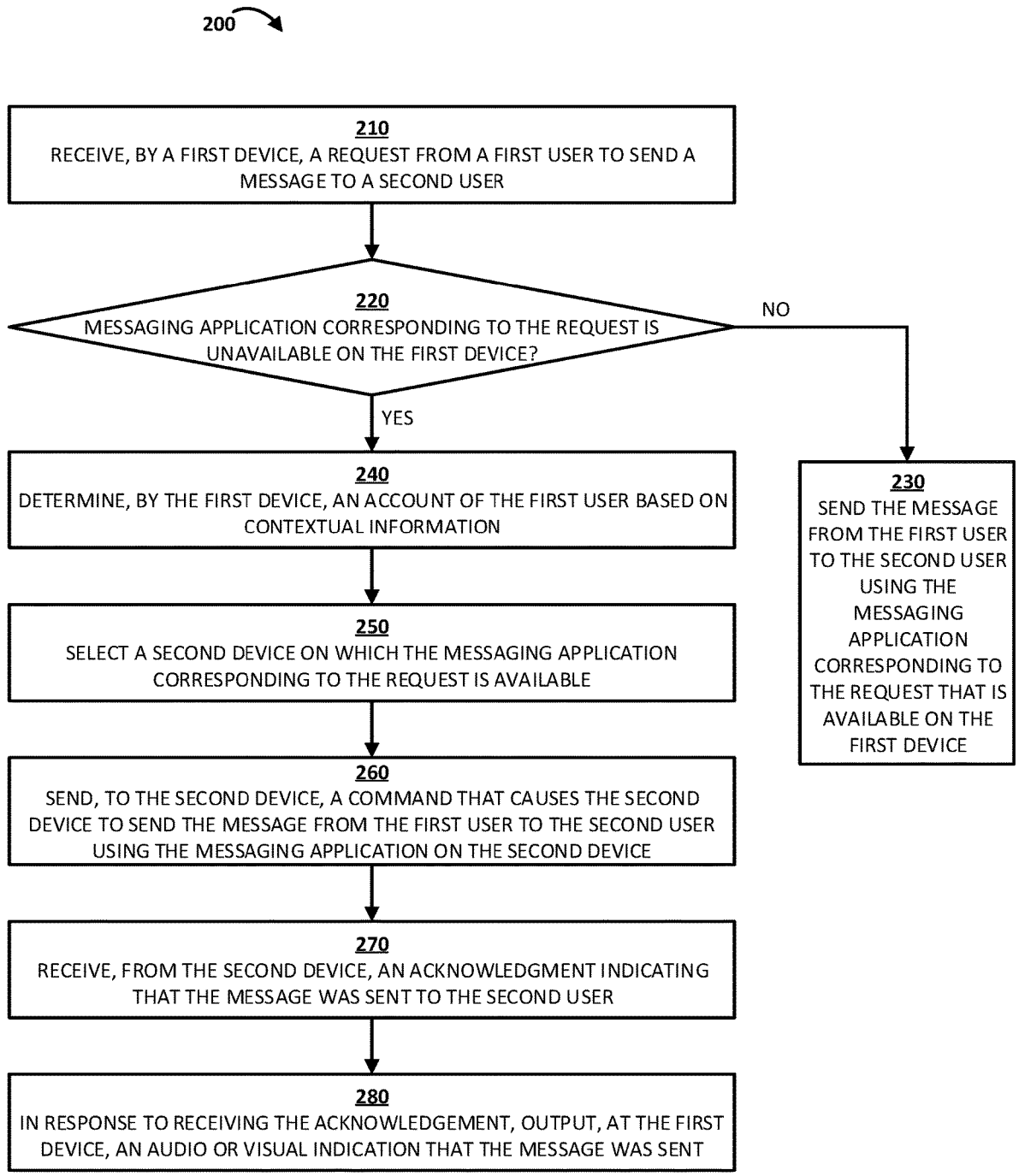
FIG. 2 depicts a flowchart illustrating an example method for practicing selected aspects of the present disclosure.

FIG. 2 is a flowchart illustrating an example method 200 of using a smart device 110 such as a standalone assistant-centric interactive speaker, a standalone assistant-centric interactive display with speaker(s), a smart appliance such as a smart television, and/or a wearable apparatus of a user to send a message using a messaging application 160 on a client device 140-1, ..., 140-n such as a mobile phone computing device, in accordance with implementations disclosed herein. For convenience, the operations of the flowchart are described with reference to a system that performs the operations. This system may include various components of various computer systems, such as one or more components of the smart device(s) 110, the client devices 140-1, ..., 140-n, and/or the computer server 170. Moreover, while operations of method 200 are shown in a particular order, this is not meant to be limiting. One or more operations may be reordered, omitted, or added.

At block 210, the system may receive, by a first device, a request from a first user to send a message to a second user. In implementations, at block 210, the smart device automated assistant 120 of the smart device 110 (i.e., the first device) may receive a request from a first user to send a message to a second user in the form of a spoken utterance received via the I/O components 130 (e.g., via a microphone) of the smart device 110.

Still referring to block 210, in implementations, the smart device automated assistant 120 of the smart device 110 may be invoked based on the smart device automated assistant 120 detecting an invocation phrase (e.g., "OK Assistant"), interaction of a hardware button or graphical button that invokes the smart device automated assistant 120, in response to a gesture detected via a camera of the I/O components 130, and/or other invocation signal(s). In implementations, after the smart device automated assistant 120 is invoked, the smart device automated assistant 120 may process audio data received by a microphone of the I/O components 130 of the smart device 110 (e.g., a spoken utterance following the invocation phrase) to identify, in the audio data, a request from the first user to send the message to the second user.

Still referring to block 210, in implementations, the smart device automated assistant 120 of the smart device 110 may convert, to text, the audio data corresponding to spoken input received after invocation of the smart device automated assistant 120, and perform NLU on the text to identify the request from the first user to send the message to the second user that is included in the audio data. In other implementations, the smart device automated assistant 120 of the smart device 110 may transmit, to the cloud-based automated assistant component(s) 180 of the computer server 170, the audio data corresponding to spoken input received after invocation of the smart device automated assistant 120 at the smart device 110. The cloud-based automated assistant component(s) 180 may then convert the audio data to text using the STT processor 181, and perform NLU on the text using the NLU engine 182 to identify the request from the first user to send the message to the second user that is included in the audio data.

Still referring to block 210, in implementations, the request that is received by the smart device automated assistant 120 may include a message, a message recipient (e.g., the second user), and optionally a messaging application, which the smart device automated assistant 120 may identify from the request. For example, the smart device automated assistant 120 of the smart device 110 may convert spoken input (e.g., an utterance) received after invocation of the smart device automated assistant 120 to the text, "Tell User1 using MessagingApp1, I am leaving for the grocery store in 10 minutes." In this example, the smart device automated assistant 120 may perform NLU to identify "I am leaving for the grocery store in 10 minutes" as the message, User1 as the message recipient, and MessagingApp1 as the messaging application.

Still referring to block 210, in implementations, if the request received by the smart device automated assistant 120 of the smart device 110 does not specify a messaging application, the smart device automated assistant 120 may determine the messaging application using preconfigured rules (e.g., use the messaging application most recently specified by the first user with respect to any message recipient, or use the messaging application most recently specified by the first user with respect to the second user, etc.).

Still referring to FIG. 2, at block 220, the system may determine if it is the case that a messaging application corresponding to the request is unavailable on the first device. In implementations, at block 220, the smart device automated assistant 120 of the smart device 110 (i.e., the first device) may determine if it is the case that a messaging application (determined at block 210) corresponding to the request received at block 210 is unavailable on the smart device 110.

Still referring to block 220, in implementations, the smart device automated assistant 120 of the smart device 110 may determine that it is the case that the messaging application corresponding to the request received at block 210 is unavailable on the smart device 110 if the messaging application corresponding to the request is neither present (available locally) on the smart device 110 (e.g., the messaging application is not one of the one of the messaging applications 135 installed on the smart device 110) nor accessible from the smart device 110 (e.g., the messaging application is not remotely accessible by the smart device 110 using an application programming interface (API) or web service). In implementations, the smart device automated assistant 120 of the smart device 110 may determine that it is not the case that the messaging application corresponding to the request received at block 210 is unavailable on the smart device 110 if the messaging application corresponding to the request is present (available locally) on the smart device 110 (e.g., the messaging application is one of the one of the messaging applications 135 installed on the smart device 110) and/or is accessible from the smart device 110 (e.g., the messaging application is accessible by the smart device 110 using an API or web service).

Still referring to block 220, in implementations, if the smart device automated assistant 120 of the smart device 110 determines that it is the case that the messaging application corresponding to the request received at block 210 is unavailable on the smart device 110, then the flow proceeds to block 240. On the other hand, in implementations, if the smart device automated assistant 120 of the smart device 110 determines that it is not the case that the messaging application corresponding to the request received at block 210 is unavailable on the smart device 110, then the flow proceeds to block 230.

Still referring to FIG. 2, at block 230, the system may send the message from the first user to the second user using the messaging application corresponding to the request that is available on the first device. In implementations, at block 230, the smart device automated assistant 120 of the smart device 110 (i.e., the first device) may cause the message to be sent from the first user to the second user in accordance with the request received at block 210, using the messaging application corresponding to the request that is available on the smart device 110.

Still referring to block 230, in implementations, if the messaging application corresponding to the request is one of the messaging applications 135 that is installed on the smart device 110, then the smart device automated assistant 120 may send an action intent request to the messaging application 135 corresponding to the request. The action intent request may include the message and the message recipient (e.g., the second user) from block 210, and in response to receiving the action intent request, the messaging application 135 may send the message to the message recipient in accordance with the received action intent request. The action intent request may optionally include the message sender (e.g., the first user), which may specify a user account from which the message is to be sent. The action intent request may also optionally include identification of the messaging application 135 corresponding to the request which is to be used to send the message.

In implementations, an action intent request can refer to a request from an application (e.g., the smart device automated assistant 130), for a particular action (e.g., sending the message) to be performed via the application or a separate application (e.g., one of the messaging applications 135). For instance, an action intent request can be generated by a third-party application and identify one or more of an action to be performed, a custom identifier, content data that is associated with the action to be performed, and/or any other data that can be associated with an action to be performed by an application. The action intent request can be initially received by an operating system, device application, automated assistant, and/or any other engine or module available of the device at which the action intent request was originated. The action intent request can then be cataloged, or otherwise queued, at the originating device, and made accessible to one or more instances of the smart device automated assistant 120 and the client device automated assistant 150 of each of the client devices 140-1, ..., **140-*n***.

Still referring to block 230, in implementations, if the messaging application corresponding to the request is remotely accessible from the smart device 110 (e.g., the messaging application is accessible by the smart device 110 using an API or web service), then the smart device automated assistant 120 may use the API, the web service, or another remotely accessible interface to cause the message to be sent from the first user to the second user in accordance with the request received at block 210. In implementations, the smart device automated assistant 120 may provide the message and the message recipient (e.g., the second user) from block 210 to the API, the web service, or the other remotely accessible user interface. The smart device automated assistant 120 may optionally provide the message sender (e.g., the first user), which may specify a user account from which the message is to be sent, to the API, the web service, or the other remotely accessible user interface. Additionally, the smart device automated assistant 120 may optionally provide identification of the messaging application 135 corresponding to the request which is to be used to send the message to the API, the web service, or the other remotely accessible user interface.

Still referring to FIG. 2, at block 240, the system, at the first device, may determine an account of the first user based on contextual information. In implementations, at block 240, the smart device automated assistant 120 of the smart device 110 (i.e., the first device) may determine an account of the first user (i.e., the user from whom the request was received at block 210) based on contextual information, such as speaker-identification features and/or biometric data.

Still referring to block 240, in some implementations, the request received at block 210 may be included in an utterance of the first user, and the smart device automated assistant 120 may determine the account of the first user by determining that the utterance is spoken by the first user based on speaker-identification features (e.g., mel-frequency cepstral coefficients (MFCCs) features, which collectively can form a feature vector) of one or more utterances of a known user. For example, the smart device 110 may store speaker identification features for each of the known users speaking "OK Assistant." In response to the speaker identification features in a currently received utterance sufficiently matching the stored speaker identification features of the known user User1 speaking "OK Assistant," the smart device 110 may classify the utterance as spoken by the known user User1.

Still referring to block 240, in some implementations, the smart device automated assistant 120 may determine the account of the first user based on biometric data, detected via one or more of the I/O components 130 of the smart device 110. For example, the smart device automated assistant 120 can determine the account of the first user based on biometric data such as facial data, fingerprint data, etc. received at block 210, matching biometric authentication data stored in association with the account. Other biometric identification can additionally or alternatively be utilized.

Still referring to block 240, in some implementations, the smart device automated assistant 120 may determine the account of the first user by processing audio data received by a microphone of the I/O components 130 and/or image data (e.g., a facial image) received by a camera of the I/O components 130 using a machine learning model to generate an embedding and comparing the generated embedding to embeddings associated with known accounts.

Still referring to block 240, in some implementations, the request received at block 210 may be included in an utterance spoken by a person, and the smart device automated assistant 120 may determine the account of the first user by receiving, from a camera of the I/O components 130 of the smart device 110, an image of the person, and determining that the utterance is spoken by the first user based on the image.

Still referring to block 240, in other implementations, the smart device automated assistant 120 of the smart device 110 may transmit, to the cloud-based automated assistant component(s) 180 of the computer server 170, voice data and/or other biometric data detected via one or more of the I/O components 130 of the smart device 110. The cloud-based automated assistant component(s) 180 may then use the voice data and/or other biometric data to determine an account of the first user. For example, the cloud-based automated assistant component(s) 180 can determine the account of the first user based on voice data, received at block 210 and transmitted to the cloud-based automated assistant component(s) 180 at block 240, matching voice authentication data stored in association with the account. Other biometric identification can additionally or alternatively be utilized, such as facial, fingerprint, etc.

Still referring to FIG. 2, at block 250, the system may select a second device on which the messaging application corresponding to the request is available. In implementations, at block 250, the smart device automated assistant 120 of the smart device 110 (i.e., the first device) may select, as the second device, one of the client devices 140-1, ..., **140-*n* on which the messaging application corresponding to the request is available. In implementations, the selecting the second device may be based on the account of the first user determined at block 240. In other implementations, the smart device automated assistant 120 of the smart device 110 may utilize the cloud-based automated assistant component(s) 180 of the computer server 170** to select the second device.

Still referring to block 250, in implementations, the smart device automated assistant 120 may query the cloud-based automated assistant component(s) 180 to identify a client device of the client devices 140-1, ..., **140-*n* that is associated with the account of the first user determined at block 240. In other implementations, the smart device automated assistant 120 may identify a client device of the client devices 140-1, ..., 140-*n* that is associated with the account of the first user determined at block 240 based on information stored on the smart device 110, and/or by querying one or more of the client devices 140-1, ..., 140-*n***.

Still referring to block 250, in implementations, the smart device automated assistant 120 selects, as the second device, the client device 140-1, ..., **140-*n* that is identified as being associated with the account of the first user. Optionally, the smart device automated assistant 120 may query the client device 140-1, ..., 140-*n* that is identified as being associated with the account of the first user to confirm that the messaging application corresponding to the request is available. If multiple client devices 140-1, ..., 140-*n* are identified as being associated with the account of the first user, then the smart device automated assistant 120 may select a client device 140-1, ..., 140-*n*** that has provided, in response to the query, confirmation that the messaging application corresponding to the request is available.

Still referring to block 250, if the smart device automated assistant 120 determines that the messaging application corresponding to the request is not available on any of the client device(s) 140-1, ..., **140-*n* identified as being associated with the account of the first user, then the smart device automated assistant 120 may return an error message to the first user, e.g., using a speaker or display of the I/O components 130 of the smart device 110**, that indicates that the message cannot be sent using the messaging application corresponding to the request.

In an example, at block 240, the smart device automated assistant 120 of the smart device 110 may determine that the account of the first user (i.e., the user who made the request received at block 210) is AccountX. Then, at block 250, the smart device automated assistant 120 may query the cloud-based automated assistant component(s) 180 to request information identifying one or more client devices that is associated with AccountX. The smart device automated assistant 120 may then receive information from the cloud-based automated assistant component(s) 180 that identifies client device 140-1 as being associated with AccountX. In response, the smart device automated assistant 120 may select client device 140-1 as the second device on which the messaging application is available.

Still referring to FIG. 2, at block 260, the system may send, to the second device, a command that causes the second device to send the message from the first user to the second user using the messaging application on the second device. In implementations, at block 260, the smart device automated assistant 120 of the smart device 110 (i.e., the first device) may send, to the client device 140-1, . . . , 140-$n$ selected at block 250 (i.e., the second device), a command that causes the client device 140-1, . . . , 140-$n$ selected at block 250 to send the message from the first user to the second user, in accordance with the request received at block 210, using the messaging application 160 corresponding to the request, on the client device 140-1, . . . , 140-$n$. In other implementations, the smart device automated assistant 120 of the smart device 110 may utilize the cloud-based automated assistant component(s) 180 of the computer server 170 to send, to the second device, a command that causes the second device to send the message from the first user to the second user using the messaging application on the second device.

Still referring to block 260, in implementations, the smart device automated assistant 120 on the smart device 110 may send, as the command, an action intent request to the client device 140-1, . . . , 140-$n$ selected at block 250. In implementations, the action intent request may optionally include a request to wake the client device 140-1, . . . , 140-$n$ from a sleep state, or the smart device automated assistant 120 on the smart device 110 may optionally send a request to wake the client device 140-1, . . . , 140-$n$ from a sleep state, to the client device 140-1, . . . , 140-$n$ selected at block 250, prior to sending the action intent request. In implementations, the action intent request may include the message and the message recipient (e.g., the second user) from block 210 and identification of the messaging application 160 (specified in the request received at block 210 or determined at block 210 based on the request). The action intent request may optionally include the message sender (e.g., the first user), which may specify a user account from which the message is to be sent.

Still referring to block 260, the client device automated assistant 150 of the client device 140-1, . . . , 140-$n$ selected at block 250 may receive the action intent request sent by smart device automated assistant 120 of the smart device 110. In response to receiving the action intent request, the client device automated assistant 150 of the client device 140-1, . . . , 140-$n$ selected at block 250 may interpret the action intent request to cause the client device automated assistant 150 to respond by treating the request received by the smart device 110 at block 210 as being received directly by the client device automated assistant 150 of the client device 140-1, . . . , 140-$n$ selected at block 250. In implementations, in response to receiving the action intent request, the client device automated assistant 150 of the client device 140-1, . . . , 140-$n$ selected at block 250 may cause the message to be sent from the first user to the second user in accordance with the request received at block 210, using the messaging application 160 corresponding to the request.

Still referring to block 260, in implementations, the client device automated assistant 150 of the client device 140-1, . . . , 140-$n$ selected at block 250 may invoke the messaging application 160 corresponding to the request without displaying client device automated assistant output on the I/O components 155 of the client device 140-1, . . . , 140-$n$ selected at block 250. Additionally, in implementations, the messaging application 160 corresponding to the request may send the message without displaying messaging application output on the I/O components 155 of the client device 140-1, . . . , 140-$n$ selected at block 250, which may conserve power on the client device 140-1, . . . , 140-$n$.

Still referring to block 260, in implementations, the client device automated assistant 150 of the client device 140-1, . . . , 140-$n$ selected at block 250 may send another action intent request to the messaging application 160 corresponding to the request. In other implementations, the client device automated assistant 150 of the client device 140-1, . . . , 140-$n$ selected at block 250 may forward the action intent request received from the smart device automated assistant 120 of the smart device 110 to the messaging application 160 corresponding to the request. The action intent request sent or forwarded to the messaging application 160 corresponding to the request may include the message and the message recipient (e.g., the second user) from block 210. The action intent request may optionally include the message sender (e.g., the first user), which may specify a user account from which the message is to be sent. The action intent request may also optionally include identification of the messaging application 160 corresponding to the request which is to be used to send the message. In implementations, in response to receiving the action intent request, the messaging application 160 may send the message to the message recipient in accordance with the received action intent request.

Still referring to block 260, in implementations, after successfully sending the message to the message recipient in accordance with the action intent request, the messaging application 160 may send an acknowledgement to the client device automated assistant 150 of the client device 140-1, . . . , 140-$n$ selected at block 250. The acknowledgment may represent confirmation that the message was successfully sent to the message recipient. In implementations, in response to receiving the acknowledgment, the client device automated assistant 150 of the client device 140-1, . . . , 140-$n$ selected at block 250 may send another acknowledgement to the smart device automated assistant 120 of the smart device 110 that confirms that the message was successfully sent to the message recipient. In other implementations, in response to receiving the acknowledgment, the client device automated assistant 150 of the client device 140-1, . . . , 140-$n$ selected at block 250 may forward the acknowledgement received from the messaging application 160 to the smart device automated assistant 120 of the smart device 110.

Still referring to FIG. 2, at block 270, the system may receive, from the second device, an acknowledgment indicating that the message was sent to the second user. In implementations, at block 270, the smart device automated assistant 120 of the smart device 110 (i.e., the first device) may receive, from the client device automated assistant 150 of the client device 140-1, . . . , 140-n selected at block 250 (i.e., the second device), an acknowledgement indicating that the message was sent to the second user. In implementations, the smart device automated assistant 120 of the smart device 110 receives the acknowledgment sent at block 260 by the client device automated assistant 150 of the client device 140-1, . . . , 140-n selected at block 250. In other implementations, the smart device automated assistant 120 of the smart device 110 receives the acknowledgment from the messaging application 160 that is forwarded, at block 260, by the client device automated assistant 150 of the client device 140-1, . . . , 140-n selected at block 250.

Still referring to FIG. 2, at block 280, in response to receiving the acknowledgement, the system may output, at the first device, an audio or visual indication that the message was sent. In implementations, at block 280, in response to receiving the acknowledgement at block 270, the smart device automated assistant 120 of the smart device 110 (i.e., the first device) may output an audio or visual indication that the message was sent, via the I/O components 130 of the smart device 110, such as speaker(s) and/or touch-screen displays of I/O components 130.

Still referring to block 280, in an example, in response to receiving the acknowledgement, the smart device automated assistant 120 of the smart device 110 may use a text-to-speech processor to convert the textual message, "Your message has been sent to UserX," to generated speech, which may then be rendered via speaker(s) of the I/O components 130. In another example, in response to receiving the acknowledgement, the smart device automated assistant 120 of the smart device 110 may cause the textual message, "Your message has been sent to UserX," to be rendered via a touch-screen display of the I/O components 130.

In other implementations, in addition to the messaging application(s) 135, the smart device 110 may include additional applications, and in addition to the messaging application(s) 160, the client devices 140-1, . . . , 140-n may include additional applications. The request received at block 210 by the smart device automated assistant 120 may be a request to perform an action (e.g., turn on a smart light, or log a 10k run) using a particular application (e.g., a smart light application or a run logging application). At block 220, the smart device automated assistant 120 may determine that the particular application corresponding to the request is unavailable on the smart device 110 (e.g., the particular application is not included in the messaging application(s) 135 or the additional applications on the smart device 110 and is not remotely accessible by the smart device 110 using an API or web service). At block 250, the smart device automated assistant 120 may select a client device 140-1, . . . , 140-n on which the particular application is available, and at block 260, the smart device automated assistant 120 may send, to the client device 140-1, . . . , 140-n, a command that causes the client device 140-1, . . . , 140-n to perform the action using the particular application. At block 270, the smart device automated assistant 120 may receive an acknowledgement indicating that the action was performed by the particular application on the client device 140-1, . . . , 140-n, and at block 280, in response to receiving the acknowledgement, the smart device automated assistant 120 may output an audio or visual indication that the action was performed using the particular application.

Figure 3:
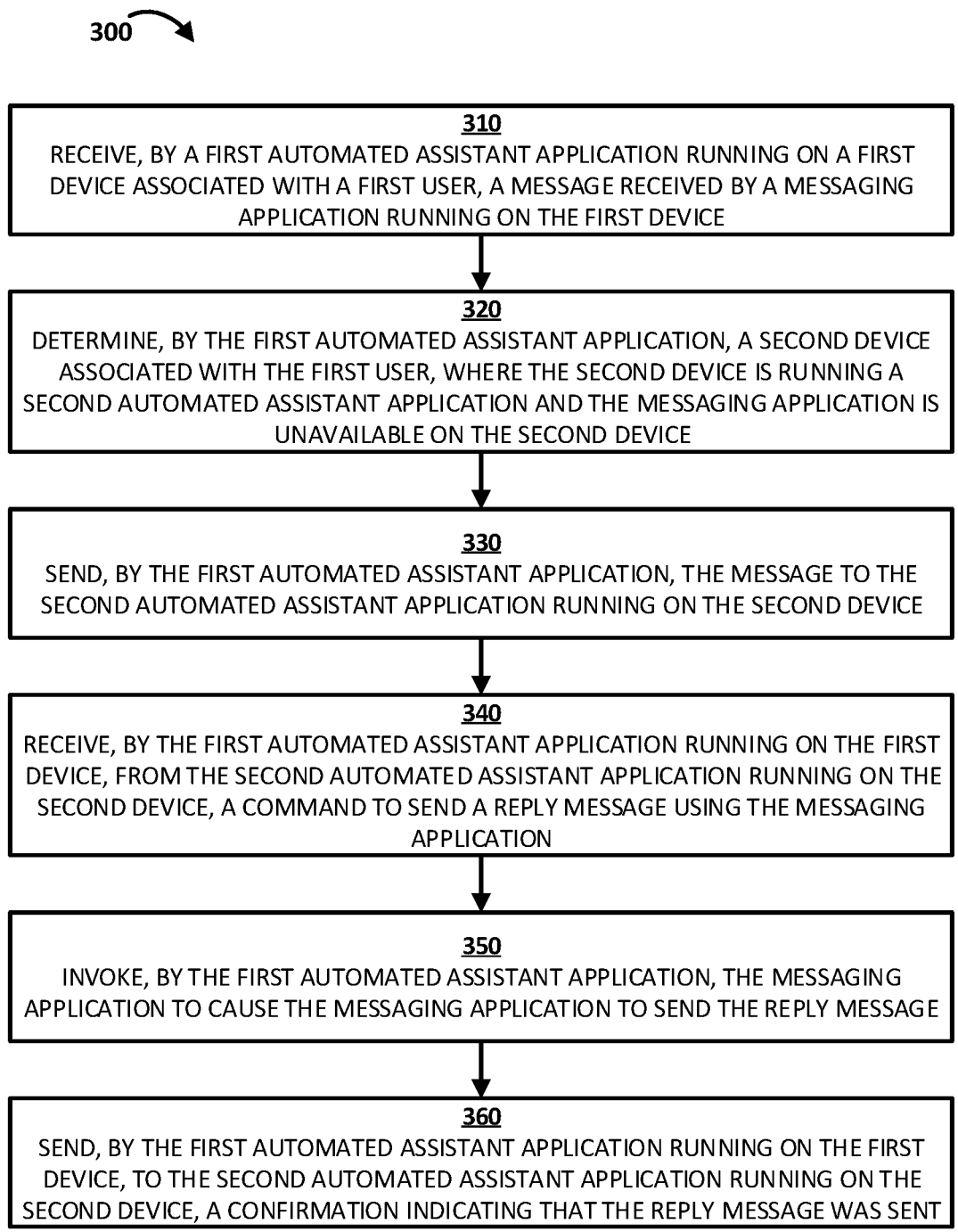
FIG. 3 depicts another flowchart illustrating an example method for practicing selected aspects of the present disclosure.

FIG. 3 is a flowchart illustrating an example method 300 of using a client device 140-1, . . . , 140-n such as a mobile phone computing device to send a message received by a messaging application 160 running on the client device 140-1, . . . , 140-n to a smart device 110 such as a standalone assistant-centric interactive speaker, a standalone assistant-centric interactive display with speaker(s), a smart appliance such as a smart television, and/or a wearable apparatus of a user, in accordance with implementations disclosed herein. For convenience, the operations of the flowchart are described with reference to a system that performs the operations. This system may include various components of various computer systems, such as one or more components of the smart device(s) 110, the client devices 140-1, . . . , 140-n, and/or the computer server 170. Moreover, while operations of method 300 are shown in a particular order, this is not meant to be limiting. One or more operations may be reordered, omitted, or added.

At block 310, the system may receive, by a first automated assistant application running on a first device associated with a first user, a message received by a messaging application running on the first device. In implementations, at block 310, the client device automated assistant 150 (i.e., the first automated assistant application) of a client device 140-1, . . . , 140-n (i.e., the first device associated with the first user) may receive a message received by a messaging application 160 running on the client device 140-1, . . . , 140-n. In implementations, the messaging application 160 may utilize end-to-end encryption to send and receive messages.

Still referring to FIG. 3, at block 320, the system may determine, by the first automated assistant application, a second device associated with the first user. In implementations, the second device may be running a second automated assistant application and the messaging application may be unavailable on the second device. In implementations, at block 320, the client device automated assistant 150 (i.e., the first automated assistant application) of the client device 140-1, . . . , 140-n may determine that a smart device 110 is a second device associated with the first user. In implementations, the smart device 110 may be running the smart device automated assistant 120 (i.e., a second automated assistant application), and the messaging application 160 may be unavailable on the smart device 110 (e.g., the messaging application 160 is not present in the messaging application(s) 135 on the smart device 110, and the messaging application 160 is not accessible from the smart device 110).

Still referring to FIG. 3, at block 330, the system may send, by the first automated assistant application, the message to the second automated assistant application running on the second device. In implementations, at block 330, the client device automated assistant 150 (i.e., the first automated assistant application) of the client device 140-1, . . . , 140-n may send the message received at block 310 to the smart device automated assistant 120 (i.e., the second automated assistant application) running on the smart device 110 (i.e., the second device). In implementations, the client device automated assistant 150 may generate an action intent request including the message, and send the action intent request to the smart device automated assistant 120. In implementations, the action intent request includes a command that causes the smart device automated assistant 120 running on the smart device 110 to render the message at the smart device 110 (e.g., using the I/O components 130).

Still referring to FIG. 3, at block 340, the system may receive, by the first automated assistant application running on the first device, from the second automated assistant application running on the second device, a command to send a reply message using the messaging application. In implementations, at block 340, the client device automated assistant 150 (i.e., the first automated assistant application) running on the client device 140-1, . . . , 140-n (i.e., the first device) may receive, from the smart device automated assistant 120 (i.e., the second automated assistant application) running on the smart device 110 (i.e., the second device), a command to send a reply message using the messaging application 160. In implementations, the client device automated assistant 150 may receive, as the command, an action intent request that includes include the reply message, and optionally the message recipient and identification of the messaging application 160.

Still referring to FIG. 3, at block 350, the system may invoke, by the first automated assistant application, the messaging application to cause the messaging application to send the reply message. In implementations, at block 350, the client device automated assistant 150 (i.e., the first automated assistant application) running on the client device 140-1, . . . , 140-n (i.e., the first device) may invoke the messaging application 160 to cause the messaging application 160 to send the reply message, in accordance with the command received at block 340.

Still referring to FIG. 3, at block 360, the system may send, by the first automated assistant application running on the first device, to the second automated assistant application running on the second device, a confirmation indicating that the reply message was sent. In implementations, at block 360, the client device automated assistant 150 (i.e., the first automated assistant application) running on the client device 140-1, . . . , 140-n (i.e., the first device) may send, to the smart device automated assistant 120 (i.e., the second automated assistant application) running on the smart device 110 (i.e., the second device), a confirmation indicating that the reply message was sent at block 350. In implementations, in response to receiving the confirmation, the smart device automated assistant 120 may output an audio or visual indication that the reply was sent, via the I/O components 130 of the smart device 110, such as speaker(s) and/or touch-screen displays of I/O components 130.

Figure 4:
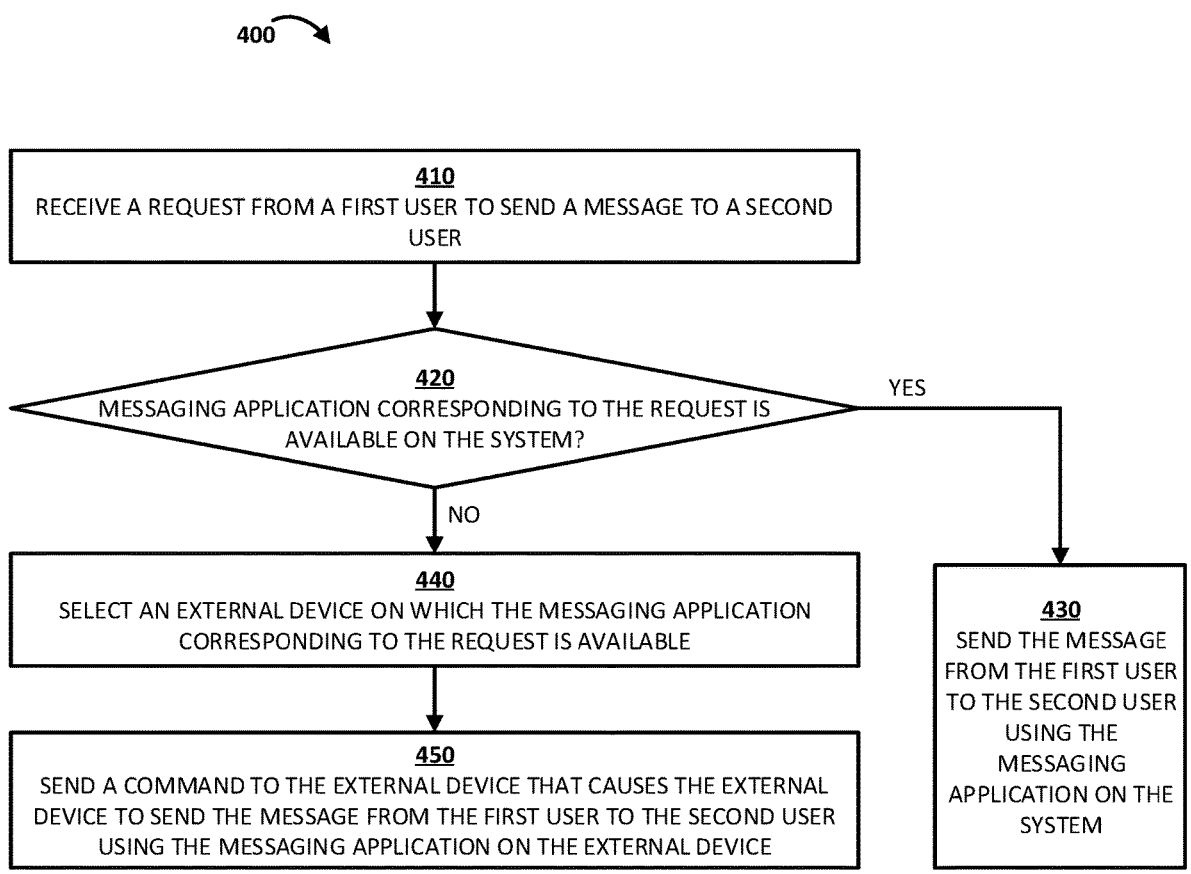
FIG. 4 depicts another flowchart illustrating an example method for practicing selected aspects of the present disclosure.

FIG. 4 is a flowchart illustrating an example method 400 of using a smart device 110 such as a standalone assistant-centric interactive speaker, a standalone assistant-centric interactive display with speaker(s), a smart appliance such as a smart television, and/or a wearable apparatus of a user to send a message using a messaging application 160 on a client device 140-1, . . . , 140-n such as a mobile phone computing device, in accordance with implementations disclosed herein. For convenience, the operations of the flowchart are described with reference to a system that performs the operations. This system may include various components of various computer systems, such as one or more components of the smart device(s) 110, the client devices 140-1, . . . , 140-n, and/or the computer server 170. Moreover, while operations of method 400 are shown in a particular order, this is not meant to be limiting. One or more operations may be reordered, omitted, or added.

At block 410, the system may receive a request from a first user to send a message to a second user. In implementations, at block 410, the smart device automated assistant 120 of the smart device 110 may receive a request from a first user to send a message to a second user.

Still referring to FIG. 4, at block 420, the system may determine whether or not a messaging application corresponding to the request is available on the system. In implementations, at block 420, the smart device automated assistant 120 of the smart device 110 may determine whether or not a messaging application corresponding to the request received at block 410 is included in the messaging application(s) 135 on the smart device 110 or remotely accessible from the smart device 110. If the smart device automated assistant 120 determines that the messaging application corresponding to the request received at block 410 is included in the messaging application(s) 135 on the smart device 110 or remotely accessible from the smart device 110, then the flow proceeds to block 430. On the other hand, if the smart device automated assistant 120 determines that it is not the case that the messaging application corresponding to the request received at block 410 is included in the messaging application(s) 135 on the smart device 110 or remotely accessible from the smart device 110, then the flow proceeds to block 440.

Still referring to FIG. 4, at block 430, in response to determining that the messaging application corresponding to the request is available on the system, the system may send the message from the first user to the second user using the messaging application on the system. In implementations, at block 430, in response to determining at block 420 that the messaging application corresponding to the request received at block 410 is included in the messaging application(s) 135 on the smart device 110 or remotely accessible from the smart device 110, the smart device automated assistant 120 may cause the messaging application 135 corresponding to the request to send the message received at block 410 from the first user to the second user.

Still referring to FIG. 4, at block 440, in response to determining that the messaging application corresponding to the request is not available on the system, the system may select an external device on which the messaging application corresponding to the request is available. In implementations, at block 440, in response to determining at block 420 that it is not the case that the messaging application corresponding to the request received at block 410 is included in the messaging application(s) 135 on the smart device 110 or remotely accessible from the smart device 110, the smart device automated assistant 120 may select one of the client devices 140-1, . . . , 140-n on which the messaging application corresponding to the request is available (e.g., the messaging application corresponding to the request is included in the messaging application(s) 160 on the client device 140-1, . . . , 140-n).

Still referring to FIG. 4, at block 450, the system may send a command to the external device that causes the external device to send the message from the first user to the second user using the messaging application on the external device. In implementations, at block 450, the smart device automated assistant 120 of the smart device 110 sends a command to the client device 140-1, . . . , 140-n selected at block 440 that causes the client device 140-1, . . . , 140-n to send the message received at block 410 from the first user to the second user, using the messaging application 160 on the client device 140-1, . . . , 140-n corresponding to the request.

Figure 5:
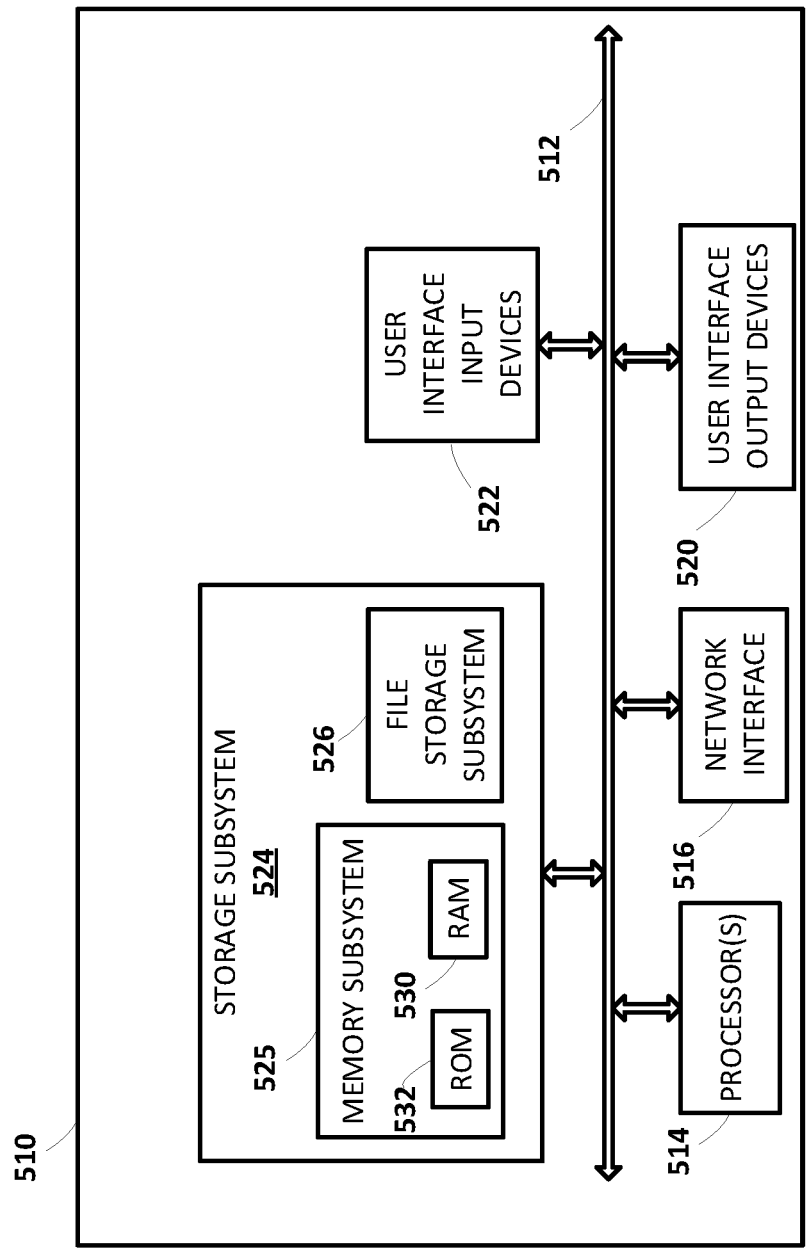
FIG. 5 illustrates an example architecture of a computing device.

FIG. 5 is a block diagram of an example computing device 510 that may optionally be utilized to perform one or more aspects of techniques described herein. Computing device 510 typically includes at least one processor 514 which communicates with a number of peripheral devices via bus subsystem 512. These peripheral devices may include a storage subsystem 524, including, for example, a memory subsystem 525 and a file storage subsystem 526, user interface output devices 520, user interface input devices 522, and a network interface subsystem 516. The input and output devices allow user interaction with computing device 510. Network interface subsystem 516 provides an interface to outside networks and is coupled to corresponding interface devices in other computing devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 510 or onto a communication network.

User interface output devices 520 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 510 to the user or to another machine or computing device.

Storage subsystem 524 stores programming and data constructs that provide the functionality of some or all of the modules described herein. For example, the storage subsystem 524 may include the logic to perform selected aspects of the methods of FIGS. 2, 3, and 4, as well as to implement various components depicted in FIG. 1.

These software modules are generally executed by processor 514 alone or in combination with other processors. The memory subsystem 525 included in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 526 in the storage subsystem 524, or in other machines accessible by the processor(s) 514.

Bus subsystem 512 provides a mechanism for letting the various components and subsystems of computing device 510 communicate with each other as intended. Although bus subsystem 512 is shown schematically as a single bus, alternative implementations of the bus subsystem may use multiple busses.

Computing device 510 can be of varying types including a workstation, server, computing cluster, blade server, server farm, or any other data processing system or computing device. Due to the ever-changing nature of computers and networks, the description of computing device 510 depicted in FIG. 5 is intended only as a specific example for purposes of illustrating some implementations. Many other configurations of computing device 510 are possible having more or fewer components than the computing device depicted in FIG. 5.

Implementations may address problems with low reliability and excessive usage of computational and/or network resources by providing methods and systems for sending a message using a messaging application. In particular, some implementations may improve the functioning of a computer by providing methods and systems for using a smart device such as a standalone assistant-centric interactive speaker and/or a standalone assistant-centric interactive display with speaker(s) to send a message using a messaging application on a client device such as a smartphone. Accordingly, through the use of rules that improve computer-related technology, implementations allow computer performance of functions not previously performable by a computer. Additionally, implementations use techniques that are, by definition, rooted in computer technology (e.g., end-to-end encryption, a STT processor, NLU, a TTS processor, etc.).

In situations in which the systems described herein collect personal information about users, or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, the method comprising:
   receiving, by a first device, a request to send a first message, the request to send the first message corresponds to a first messaging application;

determining, by the first device and based on determining the first messaging application is unavailable on the first device, that the first device is unable to send the first message;

in response to determining that the first device is unable to send the first message:

selecting, by the first device and based on the request to send the first message, a second device; and sending, by the first device to the second device, a command to cause the second device to send the first message;

receiving, by the first device, a request to send a second message, the request to send the second message corresponds to a second messaging application;

determining, by the first device and based on determining the second messaging application is available on the first device, that the first device is able to send the second message; and in response to determining that the first device is able to send the second message, sending, by the first device, the second message.

2. The method according to claim 1, wherein: selecting the second device is further based on determining that the first messaging application is available on the second device.

3. The method according to claim 1, wherein determining that the first messaging application is unavailable on the first device comprises determining that the first messaging application is not present on the first device and determining that the first messaging application is not accessible from the first device using an application programming interface.

4. The method according to claim 1, wherein:

the receiving the request to send the first message, the determining that the first device is unable to send the first message, the selecting the second device, and the sending the command to cause the second device to send the first message are performed by a first automated assistant application running on the first device; and the command is interpreted by a second automated assistant application running on the second device to cause the second automated assistant application to invoke a messaging application that is running on the second device to cause the messaging application to send the first message.

5. The method according to claim 4, wherein:

the second automated assistant application invokes the messaging application without displaying second automated assistant application output, and the messaging application sends the first message without displaying messaging application output.

6. The method according to claim 1, further comprising:

receiving, from the second device, an acknowledgment indicating that the first message was sent; and in response to receiving the acknowledgement, the first device outputting an audio or visual indication that the first message was sent.

7. A computer program product comprising one or more computer-readable storage media having program instructions collectively stored on the one or more computer-readable storage media, the program instructions executable to:

receive, by a first device, a request to send a first message, the request to send the first message corresponds to a first messaging application;

determine, by the first device and based on the first messaging application being unavailable on the first device, that the first device is unable to send the first message;

in response to determining that the first device is unable to send the first message:

select, by the first device and based on the request to send the first message, a second device; and send, by the first device to the second device, a command to cause the second device to send the first message;

receive, by the first device, a request to send a second message, the request to send the second message corresponds to a second messaging application;

determine, by the first device and based on the second messaging application being available on the first device, that the first device is able to send the second message; and in response to determining that the first device is able to send the second message, send, by the first device, the second message.

8. The computer program product according to claim 7, wherein selecting the second device is further based on determining that the first messaging application is available on the second device.

9. The computer program product according to claim 7, wherein determining that the first messaging application is unavailable on the first device comprises determining that the first messaging application is not present on the first device and determining that the first messaging application is not accessible from the first device using an application programming interface.

10. The computer program product according to claim 7, wherein:

the receiving the request to send the first message, the determining that the first device is unable to send the first message, the selecting the second device, and the sending the command to cause the second device to send the first message are performed by a first automated assistant application running on the first device; and the command is interpreted by a second automated assistant application running on the second device to cause the second automated assistant application to invoke a messaging application that is running on the second device to cause the messaging application to send the first message.

11. The computer program product according to claim 10, wherein:

the second automated assistant application invokes the messaging application without displaying second automated assistant application output, and the messaging application sends the first message without displaying messaging application output.

12. The computer program product according to claim 7, wherein the program instructions are further executable to:

receive, from the second device, an acknowledgment indicating that the first message was sent; and in response to receiving the acknowledgement, output, by the first device, an audio or visual indication that the first message was sent.

13. A system comprising:

a processor, a computer-readable memory, one or more computer-readable storage media, and program instructions collectively stored on the one or more computer-readable storage media, the program instructions executable to:

receive, by a first device, a request to send a first message, the request to send the first message corresponds to a first messaging application;

determine, by the first device and based on the first messaging application being unavailable on the first device, that the first device is unable to send the first message;

in response to determining that the first device is unable to send the first message:
  select, by the first device and based on the request to send the first message, a second device; and
  send, by the first device to the second device, a command to cause the second device to send the first message;

receive, by the first device, a request to send a second message, the request to send the second message corresponds to a second messaging application;

determine, by the first device and based on the second messaging application being available on the first device, that the first device is able to send the second message; and in response to determining that the first device is able to send the second message, send, by the first device, the second message.

\* \* \* \* \*